UNITED STATES PATENT OFFICE.

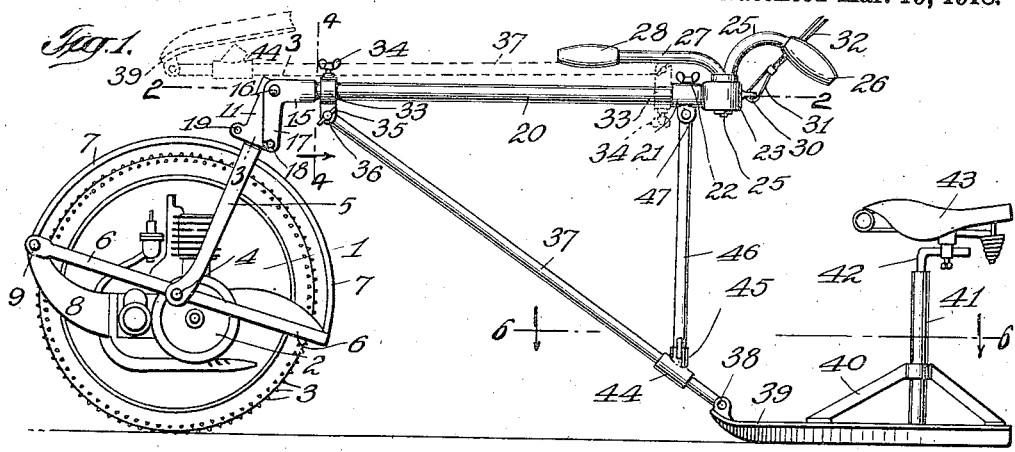

TOMAS AVOSCAN, OF NEW YORK, N. Y.

MOTOR-WHEEL FOR SKATERS.

1,259,470.

Specification of Letters Patent.  Patented Mar. 19, 1918.

Application filed June 14, 1917.  Serial No. 174,671.

*To all whom it may concern:*

Be it known that I, TOMAS AVOSCAN, a citizen of Switzerland, and resident of New York, county and State of New York, have invented certain new and useful Improvements in Motor-Wheels for Skaters, of which the following is a specification.

My invention relates more particularly to a motor-driven wheel adapted to be supported by a skater, the wheel being provided with steering means for steering the wheel, as the latter draws the skater along over ice or snow. The tire of the motor wheel is preferably provided with points or projections, adapted to prevent slipping thereof on ice or snow. A suitable motor is provided for driving the wheel which is preferably supported in a fork and steering head in the usual or any preferred manner. I have found that, for the best results, the steering handle, steering wheel, or other steering device should be located at a considerable distance, say three feet or more from the motor wheel, preferably at the end of a tubular member connected with the steering head. It is also preferable that the steering handles and steering fork be connected together to operate independently of the intermediate supporting and connecting member. This construction enables me to operate the motor wheel and maintain it substantially vertical in its rotating plane.

I also provide means for attaching to the wheel, a skate or runner, supporting a seat upon which the operator may ride, the motor wheel being steered by the same hand wheel or handle bar connections. Preferably, the skate or runner is detachably connected to the motor member, so that if the operator chooses to do so, it may be entirely removed, and the motor wheel operated by a skater having skates on his feet and skating in the usual manner.

The attachment of the skating seat may be such that the reach rod connected therewith, may be folded along the connecting member between the handle bars and the steering head and supported thereon while the motor wheel is used to draw a skater standing on skates.

In order to explain my invention, I have shown herewith one form of motor wheel for skaters together with the supplemental skating seat. In the accompanying drawings, Figure 1 represents the motor wheel with steering mechanism and the skating seat frame attached, the latter being also indicated in dotted lines in its folded position; Fig. 2 represents a horizontal cross-section on the line 2—2 of Fig. 1; Fig. 3, represents a section of the steering head on the line 3—3 of Fig. 1; Fig. 4 is a cross-section on the line 4—4 of Fig. 1, showing the adjustable connection of the reach rod connected with the skating seat; Fig. 5 is a top plan view of the handle bars; Fig. 6 is a top plan view of the seat skate looking down from a section on the line 6—6 of Fig. 1; Fig. 7 is a view looking in the direction of the arrow on the line 7—7 of Fig. 6; the skate or runner being shown in section.

Referring to the drawings, 1 represents a motor wheel which may be driven by an ordinary internal combustion engine 2 connected with the wheel in the usual or any preferred manner. This form of motor-driven wheel is well known in the art and on the market as in the Dayton motor bicycle and the well known Smith motor wheel. The motor 2 may be provided with the usual fuel tank and controlling levers and pipes such as are well known to those familiar with the art, located and operated in any suitable or preferred manner, these parts for clearness being left off the drawing. The tire of the motor wheel is preferably provided on its tread surface with a plurality of projecting points 3 adapted to enable the motor wheel to grip a surface of ice, snow, or the like. The motor wheel is revolubly mounted at 4 in a steering fork 5 in the usual or any preferred manner. A frame comprising a bar or tube 6 and a semi-circular guard plate 7 is mounted on the fork and adapted to partially inclose the motor wheel. The motor 2 is preferably provided with an extending arm 8 attached at 9 to the frame bar 6, thereby forming a torque member in order that the rotation of the motor may be transmitted to the motor wheel.

The upper end of the fork 5, as will be seen in Fig. 3 of the drawings, is provided with a cylindrical shank 10, passing through suitable bearings in the steering head 11. Suitable means such as the collar 12 may be provided for retaining the steering fork in proper relation with the steering head.

The upper end of the steering fork shank 10 is preferably provided with a pulley wheel 13 secured thereto and connected by cables 14 with steering handles or the like as will be more fully described hereinafter. The sides of the steering head 11 are preferably flat (as illustrated in Fig. 3) and near the upper end thereof, substantially on a transverse diameter of the steering pulley 13, I pivot a bifurcated bracket 15, the pivots being indicated at 16, Figs. 1, 2 and 3 of the drawings. The bracket 15 is preferably provided with downwardly extending arms 17, each having a hole in the lower end thereof through which a suitable pin or bolt 18 may be passed to secure the bracket in one or another of a plurality of positions. The sides of the steering head 11 are preferably provided with holes 19 through which the bolt or pin 18 may be passed in order to firmly secure the bracket 15 in either of its adjusted positions. The bracket 15 preferably forms part of a tubular member 20 to one end of which it is secured, this member preferably extending substantially horizontal when the device is in use by a skater or other operator. This connecting member 20 is preferably 3 or 4 feet long, and is provided at its outer or free end with a tubular telescoping cap 21 which may be secured thereto in any suitable manner, but is preferably made adjustable with relation to the tubular member 20 so as to vary the length thereof. For this purpose, the member 21 is shown as provided with a thumb screw 22 whereby it may be clamped to the member 20 in its adjusted position. The member 21 is preferably provided with a hollow head 23, adapted to contain a pulley wheel 24, as indicated in Fig. 2 of the drawings, which is secured to a pivot shaft or stud 25, extending through the upper and lower faces of the head 23. The upper end of the stud 24 is preferably provided with steering means which may be of the usual handle bar type as shown or other suitable device. In the form of device here shown, a pair of handle bars 25 extends rearward and downward with handles 26 adapted to be grasped by the operator in order that he may support and steer the motor wheel.

I have found it desirable to at times reverse the motor wheel and use it for pushing the operator, and for this purpose, I preferably secure to the stud 25 and pulley wheel 24, a second pair of handle bars 27 provided with hand grips 28 which may be used when the motor wheel is reversed, adapting it to drive toward the handle bars and push the operator.

In order that the motor wheel may be reversed in the manner indicated, I preferably connect the steering fork with the steering handles by means of cables 26 which pass around and are secured to the pulley wheels 13 and 24 respectively.

I have found that it is desirable that the motor wheel should be turned for steering, in the opposite direction from the turning of the handle bars, to obtain the best results in skating. This is opposite to the turning movement ordinarily given to a wheel of this character on a bicycle. Therefore, the cables 26, as illustrated in Fig. 2 of the drawings, are crossed, so that the pulley wheels 24 and 13 are turned in opposite directions. In order that the cables 26 may run smoothly, suitable idler pulleys 27 and 28 are preferably pivotally mounted in the forward end of the tubular member 20 or in the bracket member 15 as indicated in Fig. 2 of the drawings. Similar pulleys 29 are preferably mounted in the head 23 as will be seen at the right end of the drawing in Fig. 2.

I have already mentioned that it is sometimes desirable to reverse the motor wheel and handle bars in order that the motor wheel may be utilized to push the skater and that the pulleys 13 and 24 together with the cable connections therebetween enables me to do this readily. In reversing the motor wheel, however, it is desirable that the angle which the connecting member 20 makes with the steering head 11 should be changed in order that the motor 2 may retain a substantially vertical position as is required in normal operation. For this reason, the bracket 15, on the end of the member 20, instead of being rigid with the head is pivoted at 16 as previously pointed out, this pivotal connection being on a diameter through the steering pulley 13 on the shank 10 of the fork thereby permitting a change of angle between the member 20 and the head 11 without disturbing the cable connection. When it is desired to reverse the motor wheel for the purpose described, the bolt 18 is withdrawn from the holes in the lower ends of the bell-crank arms 17 and from the rear holes 19 of the steering head 11 and the member 20 swung downward so as to bring the holes in the arms 17 into position opposite the forward holes 19 in the steering head 11 and the bolt 18 again inserted. The parts are indicated in their normal position for forward driving in Fig. 1 of the drawing. If any slackness should occur in cables 26, this may be taken up by moving the head 21 outward and clamping it by means of the thumb screw 22.

In skating with the motor wheel, it is desirable that the downward thrust due to the torque of the motor shall be supported in part by the body of the operator directly, instead of by the arms through the handle bars 25. For this purpose I preferably provide a suitable connection between the head 23 and a belt worn by the operator. This connection is indicated by a lug 30, projecting from the head 23 and provided with a hole in which a snap-hook 31 may be secured, the hook being mounted on the end of a strap 32 or other suitable connection with a belt or the like on the body of the operator.

Thus far I have described my motor wheel device as adapted for the use of a skater skating in the usual manner, but obviously, it is desirable that at times the operator may be enabled to use the motor wheel and ride or be carried upon a seat. For this purpose, I preferably provide a collar 33 adjustably and slidably mounted upon the tubular member 20 as indicated in Fig. 1 of the drawings, a thumb screw 34 being provided for securing the collar 33 in position at either end of the bar 20. The collar 33, as indicated in Fig. 4 of the drawings, is preferably provided with a downwardly projecting lug 25 which is bifurcated and provided with a thumb screw 36, for pivotally securing therein, the end of a reach rod 37. The opposite end of the reach rod at 38 is pivotally connected with the toe of a skate or runner 39, preferably T shaped as indicated in Fig. 7 of the drawings. The skate 39 is preferably provided with a bracket 40 supporting a tubular post 41 in which the usual L-post 42 is secured, the latter being adapted to carry a saddle or seat 43 of the usual or any preferred design. The reach rod 37, at 44, is preferably provided with a socket member having a socket 45 in which the lower end of a brace rod 46 is pivotally connected to a depending lug 47 preferably projecting from the underside of the member 21, at the outer end of the tubular member 20 as indicated in Fig. 1 of the drawings. The lower end of the brace rod 46 is preferably provided with a transversely extending rod projecting on either side thereof to form foot rests 48 for the operator, as indicated in Figs. 6 and 7 of the drawings. The outer ends of the foot rests 48 are preferably bent downward at 49 to form feet extending below the lower end of the brace rod 46 in order that the latter may be used to support the handle bar end of the member 20 when the device is at rest or not being used.

When the motor wheel is to be used by a skater having skates on his feet, the reach rod 37 and the associated seat 43 may be entirely removed by loosening the thumb screw 36 and removing the reach rod 37 from the lug 35. When used this way, the brace rod 46 remains, to be used as a support for the device when at rest or in idle position.

If, however, it is desired to use the motor wheel temporarily for a person on skates, the collar 33 may be loosened from the position indicated in heavy lines in Fig. 1 of the drawings and shifted along the tubular member 20 to the position indicated in dotted lines, and then the reach rod 37 can be folded along the member 20 and secured thereto temporarily.

From the description thus far given of my motor wheel for skaters, it is believed that the operation of the device will be fully understood. When the skating seat 43 is used, the operator rests his feet on the foot rests 48 thereby holding the lower end of the brace rod 46 in the socket 45 against any upward pull by the operator on the handle bars 25.

The skate or runner 39 is preferably made T-shaped (see Fig. 7) with a wide double flange at the top in order that it may be used on either ice or snow. Since snow is usually softer than ice, if the runner portion of the skate breaks through the snow, the wide flange will act as a supporting member for the seat and rider.

I have shown one form or adaptation of my motor wheel for skaters, but obviously various modifications may be made in the details of construction without departing from the spirit or scope of the invention. This is particularly true with respect to the steering mechanism and the connections of the hand steering wheel or bars with the steering fork. Other modifications might include variations in the support by a belt or otherwise of the free end of the steering member and also in the adaptation of the device for carrying a person while seated. For this reason, I do not wish to be limited to the specific form of device shown and described.

I claim:—

1. A motor wheel for skaters comprising a motor driven wheel, a steering fork therefor, pivoted in a steering head, a member connected with said head and extending tangentially of the wheel, steering handles pivoted at the end of said member and connections between said handles and said fork whereby the wheel may be steered by said handles independently of said member.

2. A motor wheel for skaters comprising a motor driven wheel, a steering fork therefor, pivoted in a steering head, handle bars independently pivoted and connections between said handle bars and said fork whereby said fork is turned opposite to the turning of the handle bars to steer the wheel.

3. A motor wheel for skaters comprising a motor driven wheel, a steering fork therefor, pivoted in a steering head, a member pivotally connected with said head for adjustment in a vertical plane, means for rigidly connecting the head and said member together in one of a plurality of relative positions, handle bars pivoted at the free end of said member and connections between said fork and said handle bars for steering said wheel independently of said member.

4. A motor wheel for skaters comprising a motor driven wheel, a steering fork therefor, pivoted in a steering head, a tubular member connected with said head and extending tangentially of the wheel, handle bars pivotally mounted at the end of said member and cables extending through said tubular member connecting said fork and said handle bars, whereby said handle bars are adapted for turning said fork to steer said wheel relatively to said member.

5. A motor wheel for skaters comprising a motor driven wheel, a steering fork therefor, pivoted in a steering head, a tubular member connected with said head and extending tangentially of the wheel, handle bars pivotally mounted at the end of said member, cables extending through said tubular member connecting said fork and said handle bars, whereby said handle bars are adapted for turning said fork to steer said wheel relatively to said member and means for adjusting the length of said tubular member for taking up slack in said cables.

6. A motor wheel for skaters comprising a motor driven wheel, a steering fork therefor, pivoted in a steering head, a tubular member connected with said head, a telescoping end piece on said member, handle bars pivotally mounted in said end piece, cables connecting said handle bars with said fork, said cables being crossed whereby the fork is turned in an opposite direction to the handle bars and means for adjusting said end piece on said member to take up slack in the cables.

7. A motor wheel for skaters comprising a motor driven wheel, a steering fork therefor, pivoted in a steering head, a tubular member connected with said head, a telescoping end piece on said member, handle bars pivotally mounted in said end piece, cables connecting said handle bars with said fork, said cables being crossed whereby the fork is turned in an opposite direction to the handle bars, means for adjusting said end piece on said member to take up slack in the cables and means for adjusting the connection between said head and said member to vary the angle therebetween without disturbing the cable connection between said fork and the handle bars.

8. A motor wheel for skaters comprising a motor driven wheel, a steering fork therefor, pivoted in a steering head, a member connected with said head and extending tangentially of the wheel, steering handles pivoted at the end of said member, connections between said handles and said fork whereby the wheel may be steered by said handles independently of said member, and means at the free end of said member adapted for attaching thereto a strap or belt for supporting said member from the body of the operator independently of said handle bars.

9. A motor wheel for skaters comprising a motor driven wheel, a steering fork therefor, pivoted in a steering head, a member connected with said head and extending tangentially of the wheel, steering handles pivoted at the end of said member, connections between said handles and said fork whereby the wheel may be steered by said handles independently of said member and a standard depending from the free end of said member provided with feet for supporting said member when the motor is not in operation.

10. A motor wheel for skaters comprising a motor driven wheel, a steering fork therefor, pivoted in a steering head, a member connected with said head and extending tangentially of the wheel, steering handles pivoted at the end of said member, connections between said handles and said fork whereby the wheel may be steered by said handles independently of said member, a skate or runner provided with a seat and a reach rod connecting said skate with said member, said reach rod being removably attached to said member.

11. A motor wheel for skaters comprising a motor driven wheel, a steering fork therefor, pivoted in a steering head, a member connected with said head and extending tangentially of the wheel, steering handles pivoted at the end of said member, connections between said handles and said fork whereby the wheel may be steered by said handles independently of said member, a skate or runner provided with a seat, a slidable collar on said member adapted to be clamped thereto, a reach rod pivotally connecting said skate to said collar thereby permitting said reach rod and skate to be folded along said member when they are not required.

12. A motor wheel for skaters comprising a motor driven wheel, a steering fork therefor, pivoted in a steering head, a member connected with said head and extending tangentially of the wheel, steering handles pivoted at the end of said member, connections between said handles and said fork whereby the wheel may be steered by said handles independently of said member, a skate or runner provided with a seat, a foldable reach rod pivotally connected respectively to said member and to said skate and a brace rod adapted to extend from the free end of said member to said reach rod, foot rests being provided on the lower end of said brace rod for the purpose specified.

TOMAS AVOSCAN.

Copies of this patent may be obtained for five cents each, by addressing the "Commissioner of Patents, Washington, D. C."